(12) United States Patent
Weidner et al.

(10) Patent No.: US 8,801,961 B2
(45) Date of Patent: Aug. 12, 2014

(54) ELECTROCATALYST SUPPORT AND CATALYST SUPPORTED THEREON

(75) Inventors: John W. Weidner, Columbia, SC (US); Brenda L. Garcia, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 500 days.

(21) Appl. No.: 11/874,612

(22) Filed: Oct. 18, 2007

(65) Prior Publication Data

US 2009/0065738 A1    Mar. 12, 2009

Related U.S. Application Data

(60) Provisional application No. 60/852,517, filed on Oct. 18, 2006.

(51) Int. Cl.
*C09K 3/00* (2006.01)
*B01J 21/18* (2006.01)
*B01J 23/40* (2006.01)
*B01J 23/74* (2006.01)

(52) U.S. Cl.
USPC ..................................... 252/182.33; 502/185

(58) Field of Classification Search
USPC ............................ 502/185; 252/182.33, 425.3
See application file for complete search history.

(56) References Cited

U.S. PATENT DOCUMENTS

| | | | |
|---|---|---|---|
| 3,616,445 A | 10/1971 | Bianchi et al. | |
| 3,846,273 A | 11/1974 | Bianchi et al. | |
| 4,422,917 A | 12/1983 | Hayfield | |
| 4,484,999 A | 11/1984 | Asano et al. | |
| 5,028,568 A * | 7/1991 | Anderson et al. | 501/12 |
| 5,104,539 A * | 4/1992 | Anderson et al. | 210/500.25 |
| 5,173,215 A | 12/1992 | Clarke | |
| 5,419,824 A * | 5/1995 | Weres et al. | 204/268 |
| 6,818,347 B1 | 11/2004 | Jin et al. | |
| 2002/0107140 A1* | 8/2002 | Hampden-Smith et al. | 502/185 |
| 2007/0160899 A1* | 7/2007 | Atanassova et al. | 429/44 |

OTHER PUBLICATIONS

Chen et al Journal of the Electrochemical Society 2003 vol. 150 pp. E423-428.*
Dochille et al American Mineralogist vol. 53 pp. 1929-1939 Nov.-Dec. 1968.*
Garcia et al. "Mathematical Model of a Direct Methanol Fuel Cell", Journal of Fuel Cell Science and Technology, 2004, vol. 1, No. 1, pp. 43-48.

* cited by examiner

*Primary Examiner* — Patrick Ryan
*Assistant Examiner* — Aaron Greso
(74) *Attorney, Agent, or Firm* — Dority & Manning, PA

(57) ABSTRACT

In one embodiment of the present disclosure an electrocatalyst support for a fuel cell is provided which includes a doped titania metal oxide. The dopant includes a valve metal. The doped titania metal oxide has a BET surface area of greater than 20 m²/g.

7 Claims, 7 Drawing Sheets

Normal Electrode

---

In Stacks, @ V>0.9V     $C + 2H_2O \rightarrow CO_2 + 4H^+ + 4e^-$

---

Corroded Electrode

Normal Electrode

In Stacks, @ V>0.9V

$$C + 2H_2O \rightarrow CO_2 + 4H^+ + 4e^-$$

Corroded Electrode

ELECTROCATALYST SUPPORT AND CATALYST SUPPORTED THEREON

CROSS-REFERENCE TO RELATED APPLICATIONS

The present application is based on and claims priority to U.S. Provisional Application 60/852,517 having a filing date of Oct. 18, 2006, which is incorporated by reference herein.

BACKGROUND

Electrochemical cells that have porous electrodes require an electrically conductive matrix material to facilitate transportation of electrons between the electrodes. In many applications, the conductive matrix phase also serves as a support for catalyst particles that improve the reaction kinetics. Most industrial catalysts are supported inert metal oxide materials that have a high surface area and promote catalytic activity.

Fuel cell electrocatalyst manufacturers are continually trying to increase the lifetime and performance of their electrocatalysts. Increasing the lifetime of the electrocatalysts allows them to provide a more economically competitive product and improving the performance of the catalysts means that lower precious metal loadings can be used in the catalyst layers of a Membrane Electrode Assembly (MEA). The main strategy currently used to increase performance and lifetime of the electrocatalyst is to change the catalyst synthesis method or to increase the surface area of the carbon catalyst support. However, little effort has focused on developing novel catalyst support materials.

In electrochemical applications such as Polymer Electrolyte Membrane Fuel Cells (PEMFCs) and Direct Methanol Fuel Cells (DMFCs), the typical support material used is a highly conductive, high surface area carbon. However, carbon supported electrodes that operate at voltages above ~0.9 V in the presence of water are known to undergo a corrosion reaction as shown below:

$$C + 2H_2O \rightarrow CO_2 + 4H^+ + 4e^-$$

These conditions are experienced by electrocatalyst layers in PEMFC stacks as well as in water and chlorine electrolyzers.

Previous patents including U.S. Pat. Nos. 3,616,445, 3,846,273, and 4,484,999 have asserted that valve metal oxide coatings (where valve metals are assumed to be any of titanium (Ti), niobium (Nb), zirconium (Zr), hafnium (Hf), vanadium (V), molybdenum (Mo), tungsten (W), etc.) protect precious metal (i.e. platinum, palladium, rhodium, ruthenium, and iridium) catalysts inside the coating from operative cell conditions for chlorine and caustic electrochemical cells. Such processes coated a titanium substrate with a solution of liquid precursors for the valve metals and the precious metal catalysts. The coated substrate was then heated to temperatures around 600° C. in air to oxidize the precursors for the valve metals and the precious metals.

It is desirable to create an electrode for use in fuel cells with a valve metal oxide or a mixture of such oxides that protects precious metal catalysts from the destruction seen with carbon supports. However, such an electrode would be attached to a Polymer Electrolyte Membrane (PEM) and therefore could not be heated to the high temperatures described in previous patents because the PEM would be destroyed. Furthermore, a surface are of greater than 20 m²/g is desirable because larger surface area results in less voltage needed to drive a reaction.

U.S. Pat. Nos. 4,422,917, 5,173,215, and 6,818,347 describe the synthesis of various support powders for use in electrochemical applications, but the synthesis procedures involve heating mixtures of metal oxide powders to temperatures above 1000° C. and the products of the synthesis methods yield support material with a surface area less than 5 m²/g. It is even most preferred in U.S. Pat. No. 5,173,215 that particles of the support have a BET surface area less than 0.1 m²/g due to particle stability considerations. The low surface area of the particles is a drawback for using such supports for fuel cells.

Therefore, a lower temperature method is needed to synthesize a titania catalyst support. In addition there is a need for a titania catalyst support having a surface area greater than 20 m²/g and a precious metal catalyst configured for use on such a support.

SUMMARY

Objects and advantages of the present disclosure will be set forth in part in the following description, or may be obvious from the description, or may be learned through the practice of the disclosure.

The present disclosure seeks to address some of the disadvantages of previous constructions and methods. The present disclosure describes a novel electrocatalyst support for use in fuel cells and other electrochemical applications as well as the electrocatalyst supported thereon. The present disclosure is generally directed to an electrocatalyst support and a catalyst supported thereon.

For instance, in one embodiment of the present disclosure an electrocatalyst support for a fuel cell is provided which includes a doped titania metal oxide. The dopant includes a valve metal. The doped titania metal oxide has a BET surface area of greater than 20 m²/g.

In another embodiment of the present disclosure, a process for synthesizing a doped titania metal oxide electrocatalyst support for a fuel cell is disclosed. The process includes providing a surfactant, a titania metal oxide and a dopant. A solution is formed by utilizing the surfactant, titania metal oxide and dopant. The doped titania metal oxide is removed from the solution wherein the doped titania metal oxide is subjected to temperatures of less than about 500° C. throughout the process.

Other features and aspects of the present disclosure are discussed in greater detail below.

BRIEF DESCRIPTION OF THE DRAWINGS

A full and enabling disclosure, including the best mode thereof to one of ordinary skill in the art, is set forth more particularly in the specification, including reference to the accompanying Figures in which.

DETAILED DESCRIPTION

It is to be understood by one of ordinary skill in the art that the present discussion is a description of exemplary embodiments only, and is not intended as limiting the broader aspects of the present disclosure, which broader aspects are embodied in the exemplary construction.

The present disclosure is generally directed to an electrocatalyst support and a catalyst supported thereon. As described above, electrochemical cells that have porous electrodes require an electrically conductive matrix material to facilitate transportation of electrons between the electrodes. In many applications, the conductive matrix phase also serves as a support for catalyst particles that improve the reaction kinetics. With the present disclosure, an electrocatalyst support for a fuel cell is provided which includes a doped titania metal oxide.

The dopant includes a valve metal. In this regard, the term valve metal refers to a group of metals having a valve action, including aluminum, niobium, zirconium, hafnium, vanadium, molybdenum, tungsten, tantalum, titanium, and the like. In accordance with the present disclosure, the dopant can be selected from the valve metals described above as well as any combinations thereof.

In certain embodiments, the dopant is present in the electrocatalyst support in an amount of from about 1 to about 50 weight percent, more specifically in an amount of from about 1 to about 35 weight percent, more specifically in an amount of from about 5 to about 15 weight percent.

The electrocatalyst support of the present disclosure can further include a catalyst. In certain embodiments, the catalyst is a precious metal or a combination or more than one precious metal. In certain embodiments, the catalyst is an alloy such as a platinum-ruthenium alloy. In such embodiments, the platinum-ruthenium alloy is present in an amount of from about 30 to about 70 weight percent of the electrocatalyst.

The doped titania metal oxide forming the electrocatalyst support of the present disclosure has a BET surface area of greater than 20 $m^2/g$. In certain embodiments, doped titania metal oxide has a BET surface area of greater than 25 $m^2/g$, and still more particularly of greater than 30 $m^2/g$.

As described herein, the electrocatalyst support of the present disclosure can be configured for use with a polymer electrolyte membrane fuel cell. Additionally, the electrocatalyst support of the present disclosure can be configured for use with a direct methanol fuel cell.

In another aspect of the present disclosure, a process for synthesizing a doped titania metal oxide electrocatalyst support for a fuel cell is disclosed. The process includes providing a surfactant, a titania metal oxide and a dopant. A solution is formed by utilizing the surfactant, titania metal oxide and dopant. The doped titania metal oxide is removed from the solution wherein the doped titania metal oxide is subjected to temperatures of less than about 500° C. throughout the process.

Figure 1:
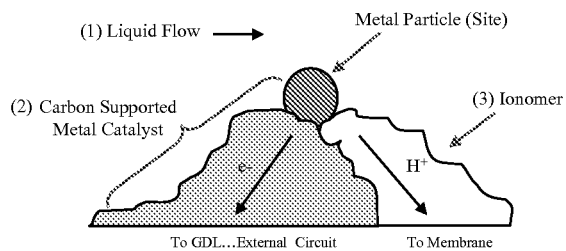
FIG. 1 illustrates the effect of carbon corrosion on reaction sites in porous electrodes.
Figure 1:
Figure 1:
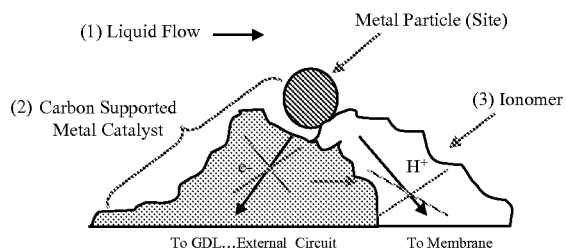

Referring to FIG. 1, the three phase contact that is necessary in porous electrodes for an active reaction site is illustrated which shows how carbon corrosion can deactivate a reaction site at high potentials. One method of increasing the durability of porous electrodes is the development of inert electrocatalyst supports. Most of the metal oxide materials traditionally used in catalysis applications are electrically insulating at temperatures below 200° C. and thus unsuitable for electrode applications.

However, metal oxides such as reduced oxidation state titania (e.g. $Ti_4O_7$ and Ebonex) and Niobium-doped $TiO_2$ (e.g. $Nb_{0.1}Ti_{0.9}O_2$) have shown promise for electrically conductive supports. In this regard, titania refers to titanium oxides or titanium oxide precursors. Titanium oxide based supports may provide catalytic advantages for the electrochemical oxidation of methanol because anatase $TiO_2$ is an active photocatalyst for the destruction of organic compounds.

It has been previously shown that mixtures of $NbO_2$ and $TiO_2$ sintered at 1000° C. lead to the formation of an electrically conducting material with an electrical conductivity in the range of 0.2-1.5 S/cm and a surface area of ~1 $m^2/g$. The high temperature synthesis methods show promising results, but lead to a low surface area material and require long amounts of time for synthesis. Since $TiO_2$ undergoes a phase transition from anatase to the less catalytically active rutile near 700° C., the high temperature synthesis may also reduce some catalytic promotion of methanol oxidation by the support.

The present disclosure describes a novel electrocatalyst support for use in fuel cells and other electrochemical applications as well as the electrocatalyst supported thereon. In certain embodiments, a high surface area doped titania electrocatalyst support is synthesized at low temperatures where the dopant is a valve metal (including but not limited to Nb or Ta). This support together with a Pt—Ru catalyst is conductive and provides improved activity toward methanol oxidation compared to an equivalent catalyst on a traditional carbon support. The doped titania support material is synthesized at temperatures less than 500° C., more particularly 400° C., and has a BET surface area greater than at least about 20 $m^2/g$. A Pt—Ru catalyst can be synthesized on the support using a colloidal method. This catalyst support material can be used in place of carbon in many electrochemical applications.

In certain embodiments, an electrocatalyst support is prepared using a surfactant templating method between 15° C. and 70° C. where a mixture of valve metal organic precursors are used. The resulting white catalyst powder is washed and dried in a vacuum oven at about 110° C. A precious metal catalyst is then deposited on the catalyst support using a colloidal catalyst synthesis technique. In such an aspect of the present disclosure, the support material is mixed with precious metal chloride catalyst precursors in an organic solvent such as ethanol or THF. The precious metal chloride catalyst precursors are reduced to the elemental precious metals using a reducing agent such as sodium borohydride, lithium borohydride, or ethylene glycol. The solution containing the electrocatalyst is filtered and washed to yield the electrocatalyst. In order to prepare an MEA for use in PEFC applications, the catalyst is suspended in a solvent such as isopropyl alcohol to form an ink which can be used to make electrodes for an MEA.

The following Examples are intended to be purely exemplary of the present disclosure. In the Examples given below, experimental data are presented which show some of the results that have been obtained from embodiments of the present disclosure for different materials, temperatures, and processes.

EXAMPLES

Example 1

The following experiment illustrates a low temperature synthesis of the electrocatalyst support, $Nb_{0.1}Ti_{0.9}O_2$, via a surfactant templating method and characterization of the catalyst using BET, XRD, and TEM. The electrocatalytic activity toward the electrochemical oxidation of methanol of a Pt—Ru catalyst supported on the $Nb_{0.1}Ti_{0.9}O_2$ is also investigated using a three electrode test and a DMFC test. The experiment is provided to further illustrate the present invention and is not intended to limit the scope of the invention.
Method:

Synthesis of an $Nb_{0.1}Ti_{0.9}O_2$ Support

The synthesis of the $Nb_{0.1}Ti_{0.9}O_2$ support was done through a modification of the procedure described in Yan et al, Preparation, characterization and photocatalytic activity of TiO2 formed from a mesoporous precursor, Journal of Porous Materials, 2004, 11(3): p. 131-139, incorporated by reference herein.

First, 0.03 moles of octadecylamine were mixed in a 250 mL beaker with 75 mL of dehydrated ethanol for 30 minutes with magnetic agitation. Second, 0.01 moles of niobium (V) ethoxide was added to the solution and allowed to mix for 15 minutes. Then, 0.09 moles of titanium (IV) butoxide was added to the solution and mixed for 15 minutes. Next, 54 mL of Di water was added to the beaker, stirring was stopped, and the gel was aged for 48 hours. The gel was filtered and then the template was removed using solvent extraction or calcination. For the solvent extraction method, 92 mL dehydrated ethanol and 8 mL of concentrated HCl were added to a round bottom flask containing the filtered sample. The mixture was then boiled under reflux for 12 hours. The product of the solvent extraction was then mixed with 200 mL of dehydrated ethanol. This mixture was adjusted to a pH of 10 with NaOH. The $Nb_{0.1}Ti_{0.9}O_2$ was then dried at 100° C. in a vacuum oven for 12 hours. For calcination, the sample was heated to 400° C. for 4 hours.

Synthesis of a 60 wt % 1:1 $Pt$—$Ru/Nb_{0.1}Ti_{0.9}O_2$ Catalyst

To synthesize the Pt—Ru catalyst on the $Nb_{0.1}Ti_{0.9}O_2$, a colloidal method was used. THF (400 mL) was heated to 40° C. with magnetic agitation. $RuCl_3$ (6.04 mmol) and $H_2PtCl_6$ (3.02 mmol) in THF were added to the mixture. $Nb_{0.1}Ti_{0.9}O_2$ (800 mg) was added to the mixture and allowed to mix for 1 hour. Then, $LiBH_4$ (60 mmol, 2 times the valence of the catalyst) in a 0.5M solution with THF was added dropwise to the mixture. The solution was allowed to mix at 40° C. for 12 hours. The THF was evaporated from the mixture and the catalyst was sonicated and washed with ethanol, benzene and water.

Three-Electrode Cyclic Voltammetry Testing

Cyclic Voltammetry (CV) studies of the catalyst activity were performed in a solution of 0.5 M $H_2SO_4$ and 1 M methanol. To synthesize a catalyst solution, 6.0 mg of the catalyst was weighted and dissolved in 3.0 mL of $H_2O$ and 3.0 mL of isopropyl alcohol (IPA). This mixture was then sonicated for 15 minutes. A binding solution was synthesized by diluting a 5 wt % Nafion® in IPA solution with more IPA 1:20 by volume. The catalyst film was loaded with 37.5 nmol of Pt. To ensure film integrity the maximum amount of catalyst solution applied were 5 µL aliquots. After the catalyst film was applied, a 5 µL aliquot of binding solution was pipetted onto the electrode and allowed to dry. The glassy carbon electrode was then submerged in a reaction flask with filled with the 0.5 M $H_2SO_4$ and 1 M methanol mixture. The solution was bubbled with $N_2$ for 15 minutes prior to testing. The counter electrode in the setup was a platinum wire electrode and the reference electrode was an $Hg/HgSO_4$ electrode with a Luggin capillary. The CV was conducted in a potential range between −0.7 V and 0.6 V versus the $Hg/HgSO_4$ electrode at a scan rate of 5 mV/s using a Princeton Applied Research 263A potentiostat controlled using Corrware. The potential scans started at open circuit (∼0.24 V), swept down to −0.7 V, swept up to 0.6 V, and swept back down to −0.70 V.

DMFC Testing

Tests were performed on a 25 $cm^2$ fuel cell from Fuel Cell Technologies. The membrane electrode assembly (MEA) was constructed with a Nafion® 117 membrane and E-TEK gas diffusion electrodes prepared according to the decal method of Wilson. The anode loading was 3 $mg/cm^2$ of 60 wt % 1:1 $Pt$—$Ru/Nb_{0.1}Ti_{0.9}O_2$ catalyst and the cathode loading was 1 $mg/cm^2$ of 40 wt % Pt/C. Tests were conducted using an 890C load cell from Scribner Associates Inc. with a methanol fuel system and the software package FuelCell® (Scribner Associates Inc.) was used to control the station. The minimum flow rate for all experiments was 2 ccm on the anode and 20 sccm on the cathode. Polarization curves between 0.2 V and open circuit were run at constant voltage and the current was allowed to equilibrate at each condition for 15 minutes before recording the current. The membrane was hydrated with water at 70° C. for 24 hours. The cell temperature and inlet temperatures were 70° C. All reagents were certified as ultra high purity.

Figure 2:
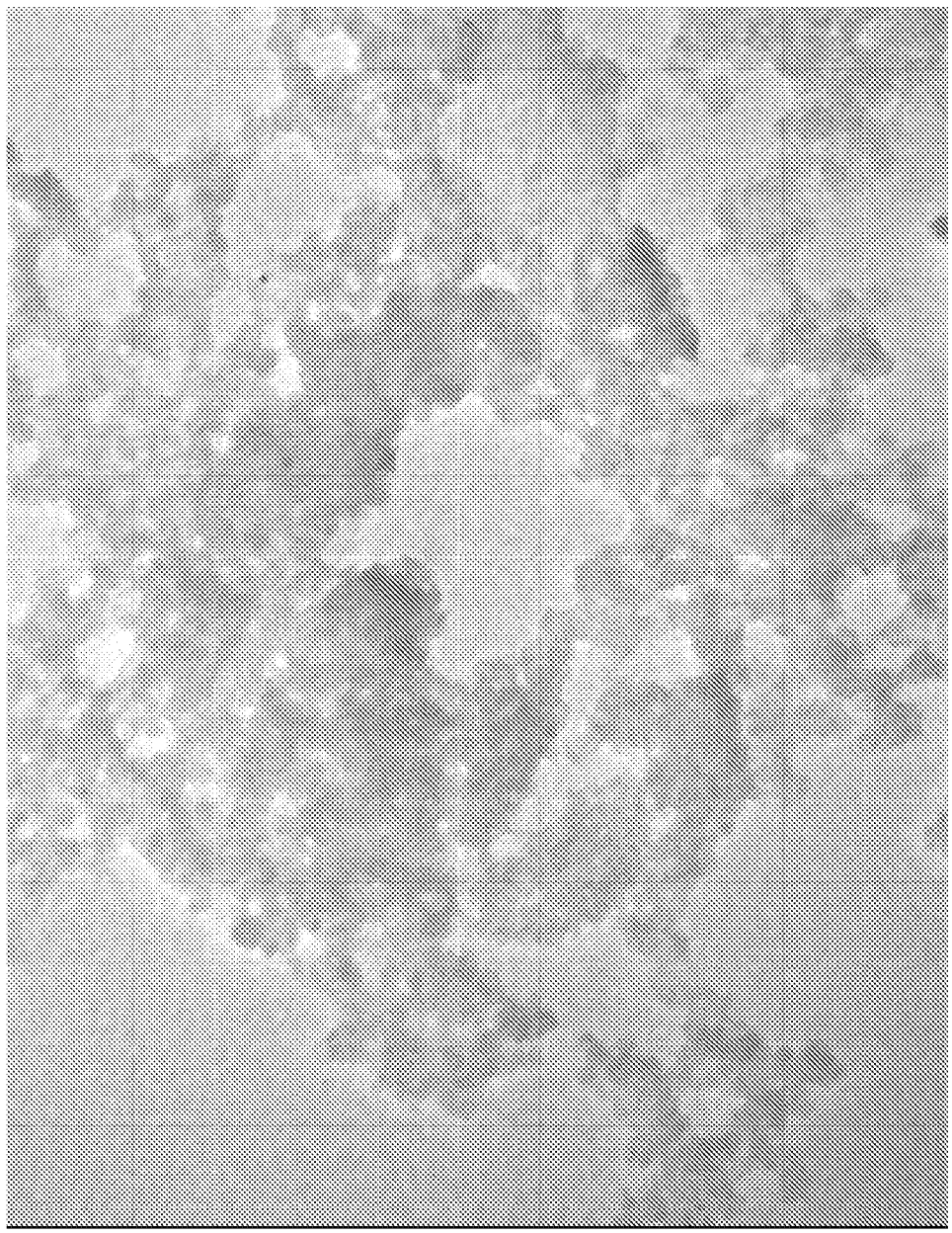
FIG. 2 illustrates a TEM image of $Nb_{0.1}Ti_{0.9}O_2$.
Figure 3:
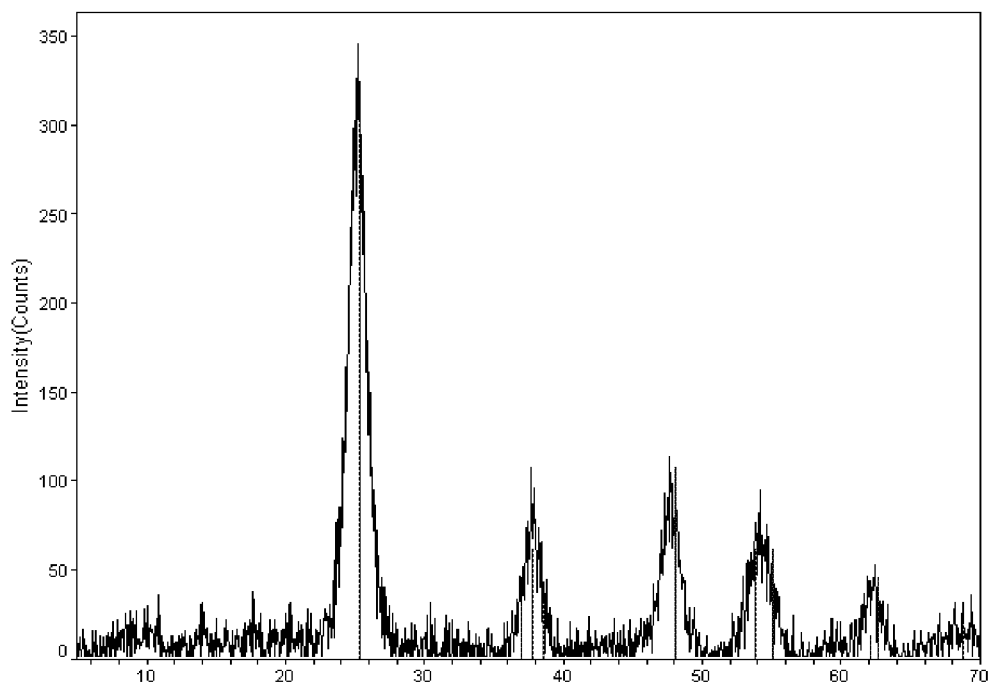
FIG. 3 illustrates XRD of the $Nb_{0.1}Ti_{0.9}O_2$ synthesized by calcination.

Results:

FIG. 2 shows a TEM image of the $Nb_{0.1}Ti_{0.9}O_2$ material after solvent extraction and drying. The material in the TEM image appears to be an agglomeration of many smaller $Nb_{0.1}Ti_{0.9}O_2$ particles. The average particle size from this sample was around 10-20 nm. It can also be seen that the particles are relatively dense and probably represent multilayer structures.

Figure 4:
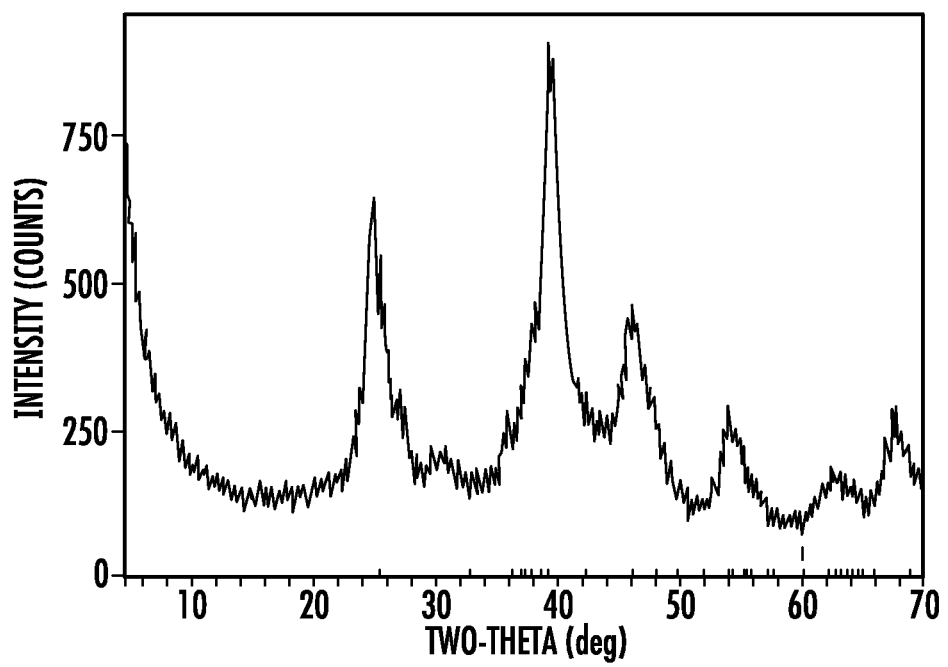
FIG. 4 illustrates XRD of the 60 wt % 1:1 PtRu/$Nb_{0.1}Ti_{0.9}O_2$.

FIG. 4 shows the XRD diffraction pattern for the calcined $Nb_{0.1}Ti_{0.9}O_2$. The vertical lines in the figure show where peaks should be expected for an anatase $TiO_2$ structure. The vertical lines match very well with the measured diffraction pattern. A search was also conducted for niobium containing structures, but no matches were found in the measured diffraction pattern. This seems to indicate that the niobium oxide is incorporated into the $TiO_2$ lattice. Since Nb and Ti have similar atomic radii the substitution into the lattice structure may not cause significant differences in the observed XRD pattern.

An XRD pattern of the $Pt$—$Ru/Nb_{0.1}Ti_{0.9}O_2$ catalyst is shown in FIG. 4. The main peaks visible in this spectrum are the peaks from platinum, as shown by the vertical red lines. The peaks that would be expected for pure ruthenium are shown by the vertical blue lines. The sample shows no peaks matching the pure ruthenium which indicates that the platinum and ruthenium are likely alloyed in the structure.

Figure 5:
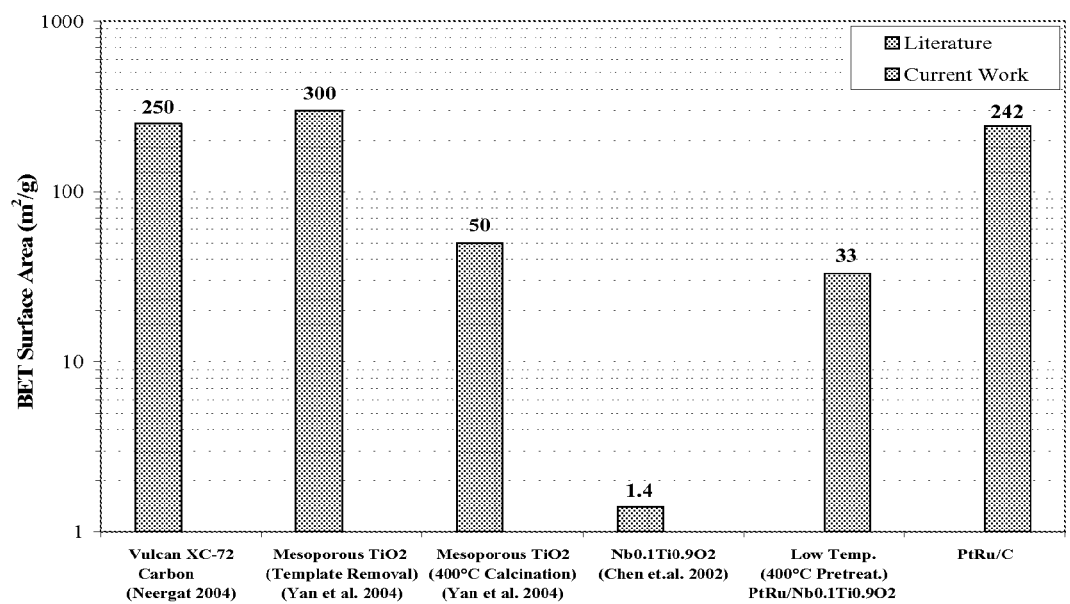
FIG. 5 illustrates a comparison of the surface area of samples synthesized in accordance with certain embodiments of the present disclosure to values from scientific literature.

BET surface area measurements were performed on the $Pt$—$Ru/Nb_{0.1}Ti_{0.9}O_2$ synthesized by the solvent extraction technique after pretreatment in $N_2$ at 400° C. for 1 hour. The surface area measured was around 33 $m^2/g$. This surface area is much lower than the 279 $m^2/g$ surface area measured by Yan et al.[5] for a mesoporous $TiO_2$ support using the solvent extraction method. The difference in the measurements may also be affected by the 400° C. sample pretreatment, because Yan et al. found that the $TiO_2$ samples calcinated at this temperature had surface area below 50 $m^2/g$. FIG. 5 shows a comparison of the surface area of samples synthesized in this work to literature samples.

Figure 6:
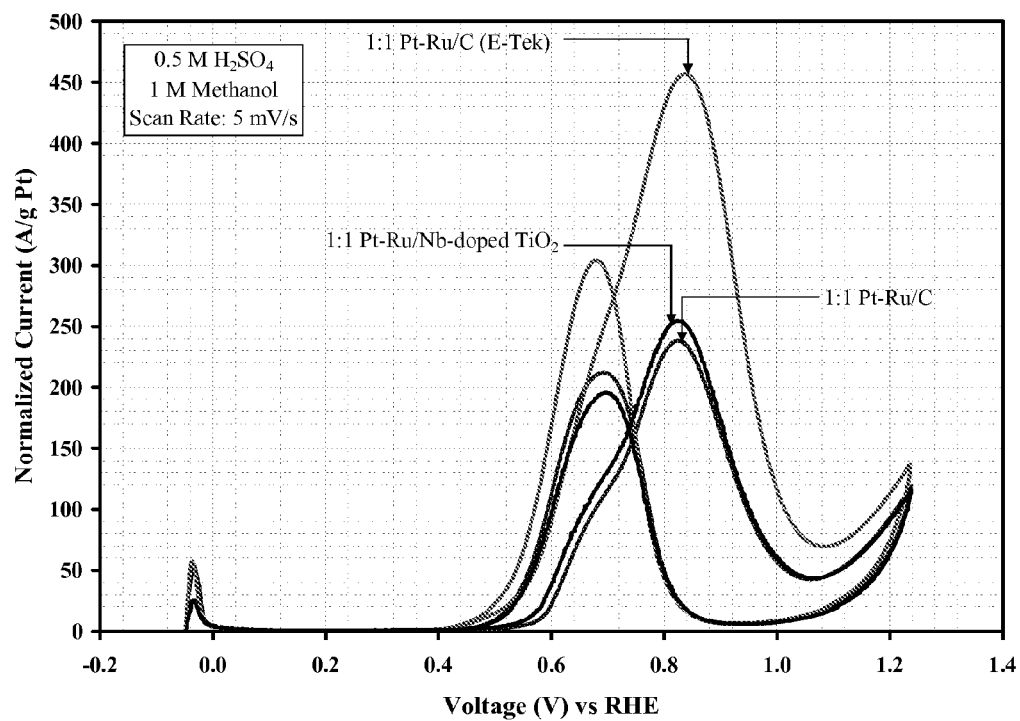
FIG. 6 illustrates voltammograms for 60 wt % 1:1 PtRu catalysts supported on carbon and $Nb_{0.1}Ti_{0.9}O_2$.

Cyclic voltammetry studies were performed on the Pt—Ru catalysts synthesized on solvent extracted $Nb_{0.1}Ti_{0.9}O_2$ supports as well as on a Ketjenblack carbon support. The voltammograms from these samples are compared with a CV from a commercial catalyst in FIG. 6. These voltammagrams are normalized according to the mass of platinum on the electrode. The activity of the catalysts supported on $Nb_{0.1}Ti_{0.9}O_2$ show that the catalyst is electrically conductive. These results indicate that the Pt—Ru on $Nb_{0.1}Ti_{0.9}O_2$ performs slightly better than a Pt—Ru/C catalyst synthesized by the same method. Both of these catalysts exhibit loweractivity than the commercial catalyst, but this difference is most likely due to the catalyst synthesis method.

Figure 7:
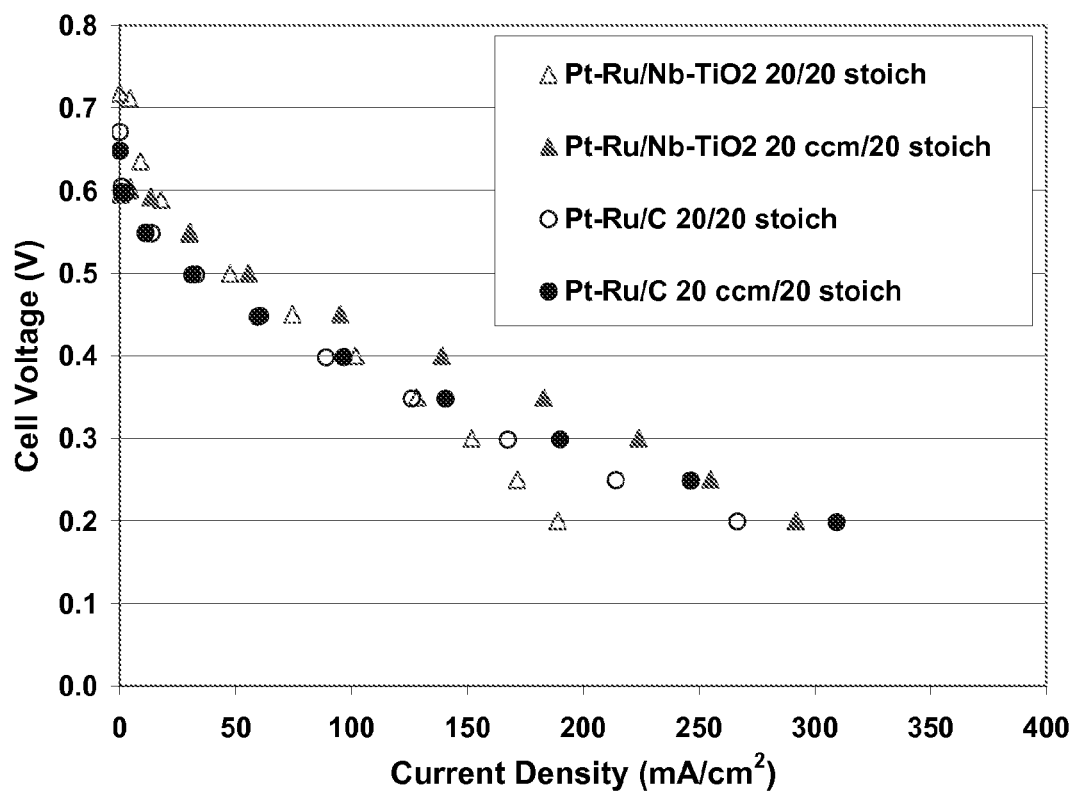
FIG. 7 illustrates DMFC polarization for a MEA with a 60 wt % 1:1 PtRu/$Nb_{0.1}Ti_{0.9}O_2$ anode catalyst.

DMFC tests were performed on the Pt—Ru catalyst prepared with $Nb_{0.1}Ti_{0.9}O_2$. Polarization results from tests at 70° C. with different methanol concentrations are shown in FIG. 7 and compared with a commercial catalyst. The anode metal loading of the MEA was 3.0 mg/cm² and the reaction area was 25 cm². With a fixed 20 ccm flow rate of 1 M methanol on the anode the $PtRu/Nb_{0.1}Ti_{0.9}O_2$ catalyst showed higher performance at higher currents. The open circuit voltage for the $Nb_{0.1}Ti_{0.9}O_2$ is slightly lower than the commercial catalyst with a 20 ccm flow rate in the anode, but with a lower flow rate in the anode, at 20 stoich, the open circuit voltage is higher than the commercial catalyst. This result is most likely due to the mass transfer characteristics of the MEA instead of the performance of the catalyst.

As described in the preceding example, a $Nb_{0.1}Ti_{0.9}O_2$ catalyst support was prepared via a low temperature route. X-ray diffraction results indicate that the niobium is incorporated into the framework of the $TiO_2$. A platinum-ruthenium catalyst supported on the $Nb_{0.1}Ti_{0.9}O_2$ appears to form alloyed catalyst particles that show a crystal structure similar to platinum. Cyclic voltammetry studies show that the supported catalyst is electrically conductive and has activity toward methanol oxidation. The CV studies also indicate that the $PtRu/Nb_{0.1}Ti_{0.9}O_2$ catalyst had slightly better performance that a PtRu/C catalyst prepared by the same method, but lower than a commercial catalyst. DMFC studies show that anode catalyst layers with a $Pt—Ru/Nb_{0.1}Ti_{0.9}O_2$ performed better than a commercial Pt—Ru/C catalyst.

The valve metal oxide support used has been $TiO_2$ doped with an amount (usually about 10 at %) of $Nb_2O_5$, $NbO_2$, or Nb. In certain embodiments, an optimum amount of dopant is between 0 and 33 wt %. Also, in certain embodiments, the catalyst used was a 1:1 mixture of Pt and Ru that accounted for between 40 and 60 wt % of the electrocatalyst. It is believed that the doped support is an n-type semiconductor with conductivity in the range of 0.01-1 S/cm. It is also believed that the 40 wt % to 60 wt % precious metal loading improves the overall conductivity of the electrocatalyst. However, these explanations for the conductive behavior of the support are not meant to limit the scope of the present discussion. The $Nb_2O_5$, $NbO_2$, or Nb dopant used in the example can easily be substituted for a $Ta_2O_5$, $TaO_2$, or Ta dopant, and other n-type dopants, including but not limited to $WO_3$, $GeO_2$, $ZrO_2$, $SnO_2$, $ThO_2$, $Fe_2O_3$, $In_2O_3$, $LiNiO_2$, and $P_2O_5$, would also provide similar results.

Example 2

Procedure Details:
This procedure makes a 10 mol % Nb-doped $TiO_2$ via a surfactant templating mechanism. This surfactant templating mechanism utilizes an $NH_4OH$ refluxing process to increase the support surface area and stability.
Lab Supplies:
1. Vacuum Oven
2. 2-Magnetic Stirrer
3. 2-Magnetic Stir Bar
4. 2-250 mL Beakers
5. Buechner Funnel and Filter Paper
6. 1000 mL Round Bottom Flask
7. 1000 mL Round Bottom Flask Heating Mantle
8. Condenser for Round Bottom Flask
9. Petri Dishes
10. pH Meter
11. Spatula
12. Weighing Boats
13. Gloves Chemicals:
Titanium Isopropoxide
Niobium Ethoxide
Hexadecyltrimethylammonium bromide (CTAB)
Absolute Ethanol
HCl
Method:
Prepare CTAB solution:
1. In a 250 mL beaker, dissolve 4.85 g of CTAB in a solution consisting of 70 mL and 18.26 mL DI water.
2. In the other 250 mL beaker, combine 9.58 mL of concentrated HCl, 27 mL of ethanol, 22.11 mL of titanium isopropoxide, and 2.08 mL of niobium ethoxide and mix well.
3. Slowly mix the sol-gel precursor solution from Step 2 together with the aqueous CTAB solution from Step 1 and mix well for 1 hour.
4. Divide the solution between several Petri dishes, leaving only a small film of the liquid in the bottom of the Petri dish.
5. Maintain the Petri dishes to 60° C. for 7 days.
$NH_3$ Extraction:
1. After the 7 days, recombine and weight the solid material.
2. In a 1000 mL round bottom flask, combine the solid material and 50 mL of DI water for every gram of solid.
3. Add a saturated $NH_4OH$ to the mixture until the pH is approximately 9.5.
4. Sonicate mixture and mix for 15 minutes.
5. Readjust pH to 9.5 using $NH_4OH$.
6. Place round bottom flask in condenser apparatus and reflux the mixture for 48 hours.
7. Filter the sample in a Buechner funnel with analytical grade filter paper.
8. Dry the sample in the oven for 6 hours at 100° C. and then ramp the temperature at 2° C./minute to 450° C. and hold that temperature for 4 hours to calcine the support.
9. Crush sample and store it in a dry location.

Example 3

Procedure Details:
This procedure makes a 60 wt % 1:1 PtRu/Nb-doped $TiO_2$ catalyst in Ethylene Glycol containing 0.2 M NaOH. This particular procedure makes 1200 mg of catalyst, but can be scaled to make different amounts.
Lab Supplies:
1. Sonicator
2. Vacuum Oven
3. Magnetic Stirrer
4. Magnetic Stir Bar
5. 500 mL Round Bottom Flask Heating Mantle
6. 500 mL Round Bottom Flask with Stopper
7. Buechner Funnel and Vacuum Filtration Flask
8. 0.2 Micron Pall Membrane Filter
9. Evaporating Dish
10. pH Meter
11. Spatula
12. Weighing Boats
13. Gloves
Chemicals:
Platinum (II) Chloride powder
Ruthenium (III) Chloride powder
Ethylene Glycol (EG) containing 0.2 M NaOH
1M $HNO_3$
Method:
Prepare the Nb-doped $TiO_2$ in the Ethylene Glycol:
1. Mechanically grind 500 mg of Nb-doped $TiO_2$ until it is a fine powder.

2. Put Nb-doped $TiO_2$ in the round bottom flask and add 187 mL EG.
3. Sonicate the mixture for 45 minutes.

Synthesis the catalysts in the glove box:
1. Platinum (II) Chloride and Ruthenium (III) Chloride
2. Magnetic Stirrer
3. Stir Bar
4. Heating Mantle
5. Weighing Boats
6. Spatula
7. Round Bottom Flask with Stopper (contains EG and support)

Starting synthesis in the glove box:
1. Weight 2.533 mmol of $PtCl_2$ and add to the round bottom flask.
2. Weight 2.533 mmol of $RuCl_3$ and add to the round bottom flask.
3. Stopper flask and mix solution well.
4. Heat solution to 160° C. while stirring vigorously. During the heating, the precursors will change color from orange and brown to black as they are reduced.
5. Stop heat and let the reaction mixture cool for 3 hours.

Filtering the catalyst in the hood:
1. Remove the solution from the glovebox and add 200 mL of water.
2. Add 1 M $HNO_3$ to adjust the pH of the solution to 1, the final volume should be no more than 500 mL.
3. Stir for 3 hours to allow adsorption of the catalyst particles on the support.
4. Let the mixture stand overnight to let catalyst particles settle out of the mixture.
5. Filter the catalyst in a Buechner Funnel.
6. Wash the catalyst with 1000 mL of DI water.
7. Dry the catalyst in a vacuum oven at 90° C. for 6 hours.
8. Maintain the catalyst in a dry location until use.
9. Crush the catalyst to a fine powder before use.

The foregoing description along with other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed:

1. A process for synthesizing a doped titania metal oxide electrocatalyst support for a fuel cell comprising:
   providing a surfactant, a titania metal oxide, and a dopant wherein the dopant comprises niobium or tantalum;
   forming a solution by utilizing the surfactant, titania metal oxide and dopant;
   removing a doped titania metal oxide from the solution to form a support wherein the doped titania metal oxide is subjected to temperatures of less than about 500° C. throughout the process, wherein a phase transition of the doped metal oxide is avoided, and the dopant is present in the doped titania metal oxide in an amount of from about 1 to about 35 weight percent;
   depositing an electrocatalyst on the doped titania metal oxide support such that the electrocatalyst forms alloyed particles on the doped titania metal oxide support.

2. The process of claim 1, wherein the electrocatalyst comprises a precious metal.

3. The process of claim 1, wherein the electrocatalyst comprises a platinum-ruthenium alloy.

4. The process of claim 3, wherein the platinum-ruthenium alloy is present in an amount of from about 30 to about 70 weight percent of the electrocatalyst.

5. The process of claim 1, wherein the doped titania has a BET surface area of greater than 25 $m^2/g$.

6. The process of claim 1, wherein the doped titania has a BET surface area of greater than 30 $m^2/g$.

7. The process of claim 1, wherein the doped titania metal oxide is subjected to temperatures of less than about 400° C.

* * * * *